(12) United States Patent
Fujihara et al.

(10) Patent No.: US 7,772,319 B2
(45) Date of Patent: Aug. 10, 2010

(54) THERMOPLASTIC ELASTOMER COMPOSITION AND COMPOSITE MOLDED ARTICLE MANUFACTURED FROM THE SAME

(75) Inventors: Shuji Fujihara, Ibi-gun (JP); Toyoaki Kurihara, Tsukuba (JP); Kenichi Hamada, Tsukuba (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 12/064,919

(22) PCT Filed: Aug. 25, 2006

(86) PCT No.: PCT/JP2006/316679

§ 371 (c)(1),
(2), (4) Date: Feb. 26, 2008

(87) PCT Pub. No.: WO2007/023932

PCT Pub. Date: Mar. 1, 2007

(65) Prior Publication Data

US 2009/0105396 A1    Apr. 23, 2009

(30) Foreign Application Priority Data

Aug. 26, 2005    (JP)    ............... 2005-245228

(51) Int. Cl.
*C08L 53/00*    (2006.01)
(52) U.S. Cl. ............... 524/505; 524/490; 524/500; 524/502; 525/89
(58) Field of Classification Search ........... 524/490, 524/500, 502, 505; 525/89
See application file for complete search history.

(56) References Cited

U.S. PATENT DOCUMENTS

| | | | |
|---|---|---|---|
| 5,002,625 A | 3/1991 | Naritomi et al. | |
| 5,149,589 A | 9/1992 | Naritomi et al. | |
| 6,143,826 A | 11/2000 | Ohnaga et al. | |
| 6,228,946 B1 | 5/2001 | Kitayama et al. | |
| 6,414,059 B1 | 7/2002 | Kobayashi et al. | |
| 6,476,129 B2 | 11/2002 | Masubuchi | |

2003/0134984 A1    7/2003    Greulich et al.

FOREIGN PATENT DOCUMENTS

| | | | |
|---|---|---|---|
| CN | 1218817 A | | 6/1999 |
| EP | 0 863 184 A1 | | 9/1998 |
| GB | 2 280 189 A | | 1/1995 |
| JP | 1-139240 | | 5/1989 |
| JP | 3-100045 | | 4/1991 |
| JP | 3-234745 | | 10/1991 |
| JP | 6-65467 | | 3/1994 |
| JP | 8-72204 | | 3/1996 |
| JP | 10-130451 | | 5/1998 |
| JP | 2001-278985 | | 10/2001 |
| JP | 2002 201244 | | 7/2002 |
| JP | 2004160870 A | * | 6/2004 |
| JP | 2004161917 A | * | 6/2004 |
| JP | 2005 36064 | | 2/2005 |
| JP | 2005-54065 | | 3/2005 |
| JP | 2005054065 A | * | 3/2005 |
| JP | 2005255702 A | * | 9/2005 |
| KR | 1994-0011553 | | 6/1994 |
| KR | 10-2005-0030969 | | 3/2005 |
| WO | WO 2004/013225 A1 | | 2/2004 |
| WO | WO 2006/001136 | | 1/2006 |

* cited by examiner

*Primary Examiner*—David Wu
*Assistant Examiner*—Marie Reddick
(74) *Attorney, Agent, or Firm*—Oblon, Spivak, McClelland, Maier & Neustadt, L.L.P.

(57) ABSTRACT

To provide a thermoplastic elastomer composition which can tightly adhere to a resin having a polar group without the need of using any adhesive and is excellent in water resistance, rubber properties and moldability, or to provide a composite molded article manufactured from the composition.

A thermoplastic elastomer composition comprising: (a) 100 parts by mass of a styrene block copolymer constituted by a [vinyl aromatic polymer block (A1)]-[hydrogenated conjugated diene polymer block (A2)]-[vinyl aromatic polymer block (A1)]; (b) 2 to 1000 parts by mass of an acrylic block copolymer having a methacrylic acid ester polymer block (B3) and an acrylic acid ester polymer block (B1); and (c) 2 to 200 parts by mass of a block copolymer containing a hydrophilic group; and a composite resin molded article manufactured by compositing the thermoplastic elastomer composition with a thermoplastic resin.

5 Claims, No Drawings

THERMOPLASTIC ELASTOMER COMPOSITION AND COMPOSITE MOLDED ARTICLE MANUFACTURED FROM THE SAME

TECHNICAL FIELD

The present invention relates to a thermoplastic elastomer composition containing a styrene-block copolymer having a specific block structure, an acrylic block copolymer, and a block copolymer containing a hydrophilic group. The thermoplastic elastomer composition of the present invention provides a composite resin molded article tightly adhered to a polar resin without using an adhesive, and is excellent in water resistance, rubber properties and moldability.

BACKGROUND ART

Recently, lamination of an elastomer layer on a hard resin molded article has been practiced to improve the air-tightness and moisture resistance to prevent leakage of gas, liquid and the like, the shock absorption of a molded article, the non-slip effect, or the touch.

In order to achieve these objectives, conventionally styrene-based elastomer or olefin-based elastomer which is excellent in flexibility has been laminated on a hard resin molded article. However, since hard resins other than the olefin-based resins such as polypropylene and the like, for example, an ABS resin or a polycarbonate resin have poor heat thermal adhesiveness with a styrene-based elastomer or an olefin-based elastomer, a composite molded article of such resin and elastomer is produced by providing a convexo-concave surface on the part to be bound, coating the core article partially with a surface layer material, joining them mechanically by extending the surface layer material to the backside of the core article through a hole made therein, or applying the one such as a primer, which works on the part to be bound as an adhesive agent. As a result, the obtained composite molded article had problems such as inferior adhesiveness, increased complexity of the structure and increased number of processes, and the like. Furthermore, even if a polar thermoplastic elastomer such as a polyamide-based elastomer, a polyurethane-based elastomer, or a polyester-based elastomer is laminated alone on a hard resin molded article such as an ABS resin or a polycarbonate resin, the balance of flexibility, heat adhesiveness and moldability remains insufficient.

In an attempt to solve such problems, in Patent Documents 1 to 6 are disclosed methods in which a polyamide-based elastomer, a polyurethane-based elastomer, a polyester-based elastomer or the like is added to the styrene-based elastomer to be laminated. However, even such methods do not provide a product which is well-balanced in flexibility, heat adhesiveness and moldability, moreover, there are shortcomings of hydrolysis, and the like, and thus the demands of the market were not quite met.

On the other hand, the Patent Document 7 proposes a composition characterized by containing two components, that is, an acryl-based block copolymer and an olefin-based polymer containing a styrene-based elastomer or an olefin-based elastomer. However, in the composition containing those two components only, there was room for improvement in tensile strength and the like, because of the insufficient dispersion of the two components.

Patent Document 1: Japanese Patent Laid-Open Publication No. H01-139240

Patent Document 2: Japanese Patent Laid-Open Publication No. H03-100045

Patent Document 3: Japanese Patent Laid-Open Publication No. H03-234745

Patent Document 4: Japanese Patent Laid-Open Publication No. H06-65467

Patent Document 5: Japanese Patent Laid-Open Publication No. H08-72204

Patent Document 6: Japanese Patent Laid-Open Publication No. H10-130451

Patent Document 7: Japanese Patent Laid-Open Publication No. 2005-54065

DISCLOSURE OF THE INVENTION

Problems to be Solved by the Invention

An object of the present invention is to provide a thermoplastic elastomer composition and a composite molded article thereof, which are excellent in flexibility, rubber elasticity, water resistance, weather resistance, and moldability, in heat adhesiveness to a hard thermoplastic resin such as a polycarbonate, an ABS resin, an acrylic resin, a styrene-based resin and a polyester resin, and in affinity for urethane-based coating and acrylic coating and the like, and which provide excellent tensile strength.

Means for Solving the Problems

In other words, the present invention relates to a thermoplastic elastomer composition comprising:

(a) 100 parts by mass of a styrene-based block copolymer having a number average molecular weight of 70000 or more which is formed by a hydrogenation of a block copolymer having at least two terminal polymer blocks (A1) comprising vinyl aromatic compound units, and at least one intermediate polymer block (A2) comprising a conjugated diene compound unit;

(b) 2 to 1000 parts by mass of an acrylic block copolymer having at least one polymer block (I) composed of an acrylic ester-based polymer (B1), and at least one polymer block (II) composed of an acrylic ester-based polymer (B2) having a different structure from that of the acrylic ester-based polymer (B1), or a methacrylic acid ester-based polymer (B3); and (c) 2 to 200 parts by mass of a block copolymer containing a hydrophilic group.

Moreover, the present invention relates to a molded article comprising the above-described thermoplastic elastomer composition, and to a composite resin molded article comprising the above-described thermoplastic elastomer composition and a thermoplastic hard resin.

EFFECT OF THE INVENTION

The present invention provides a thermoplastic elastomer composition and a composite resin molded article thereof, which are excellent in flexibility, rubber elasticity, water resistance, weather resistance, and moldability, in heat adhesiveness to a hard thermoplastic resin such as a polycarbonate, an ABS resin, an acrylic resin, a styrene-based resin and a polyester resin, and in affinity for urethane-based coating, acrylic coating and the like, and which provides excellent tensile strength.

BEST MODE FOR CARRYING OUT THE INVENTION

In the present invention, it is indispensable and important to use the following 3 components. Explanations will be given for each component in the following.

Component (a)

The styrene-based block copolymer used in the present invention is formed by a hydrogenation of a block copolymer having at least two terminal polymer blocks (A1) mainly composed of a vinylaromatic compound unit, and at least one intermediate polymer block (A2) mainly composed of a conjugated diene compound unit. Although the styrene-based block copolymer may have a block structure with a branch, tri-block copolymer represented by a formula: (A1)-(A2)-(A1) [wherein (A1) represents a polymer block comprising a vinylaromatic compound unit, (A2) represents a polymer block comprising a hydrogenated conjugated diene compound unit, and "-" represents a bond between the polymer blocks] is preferable in order to develop the excellent flexibility in the thermoplastic elastomer composition of the present invention and the molded articles thereof and the like. Examples of a vinylaromatic compound which is used to form the terminal polymer block (A1) include styrene, α-methylstyrene, o, m or p-methylstyrene, 2,4-dimethylstyrene, vinylnaphthalene, vinylanthracene and the like, among which styrene and α-methylstyrene are preferable. The vinylaromatic compound may be used alone or in a combination of two or more kinds. Examples of a conjugated diene compound which can be used to form the intermediate polymer block (A2) include 1,3-butadiene, isoprene, 2,3-dimethyl-1,3-butadiene, 1,3-pentadiene, 1,3-hexadiene and the like, of which isoprene, 1,3-butadiene or a mixture thereof is preferable. The conjugated diene compound may be used alone or in a combination of two or more kinds. Microstructure of the conjugated diene block in the styrene-based block copolymer is not particularly limited. For example, when the conjugated diene block is a block composed of polyisoprene, a degree of 70 mol % or more of 1,4 bonding is preferable. When the conjugated diene block is a block composed of polybutadiene, a degree of 40 to 80 mol % of 1,4 bonding is preferable.

A content of the terminal polymer block (A1) in the styrene-based block copolymer is preferably 5 to 75% by mass. The content of the terminal polymer block (A1) out of this range is not preferable because the thermoplastic elastomer composition mainly composed of the block copolymer is not sufficiently provided with rubber elasticity. Number average molecular weight of the styrene-based block copolymer is 70,000 or more, preferably 100,000 to 300,000. The molecular weight below the above range is not preferable because the mechanical strength is insufficient, and the heat resistance is significantly reduced. When the molecular weight is beyond the above range, the moldability tends to be insufficient. Furthermore, at least 90 mol % or more of the double-bond of the conjugated diene compound unit is required to be hydrogenated. Hydrogenation of less than 90 mol % is not preferable because mechanical strength and weather resistance become poor.

Component (b)

The acrylic block copolymer used in the present invention contains at least one polymer block (I) composed of an acrylic ester-based polymer (B1), and at least one polymer block (II) composed of an acrylic ester-based polymer (B2) having a different structure from that of the acrylic ester-based polymer (B1), or a methacrylic acid ester-based polymer (B3).

The acrylic ester-based polymer (B1) which constitutes the polymer block (I) in the acrylic block copolymer is mainly composed of acrylic ester units, and 60 mol % or more, preferably 80 mol % or more of the structural units of the acrylic ester-based polymer (B1) are the acrylic ester units.

Examples of an acrylic ester unit constituting the acrylic ester-based polymer (B1) as a structural unit include methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxy ethyl acrylate, glycidyl acrylate, allyl acrylate and the like. The acrylic ester-based polymer (B1) is constituted of the above-described acrylic ester units of one kind or two or more kinds in combination.

Among the above compounds, from the viewpoint of flexibility of the obtained thermoplastic elastomer composition, the acrylic ester-based polymer (B1) constituting the polymer block (I) is preferably composed of one kind or two or more kinds of the structural units derived from an acrylic ester selected from ethyl acrylate, n-propyl acrylate, isopropyl acrylate, n-butyl acrylate, 2-ethylhexyl acrylate, pentadecyl acrylate, dodecyl acrylate and 2-methoxyethyl acrylate, more preferably, composed of one kind or two or more kinds of the structural units derived from acrylic ester selected from ethyl acrylate, n-propyl acrylate, n-butyl acrylate, 2-ethylhexyl acrylate and dodecyl acrylate.

As mentioned above, the polymer block (II) in the acrylic block copolymer is composed of the acrylic ester-based polymer (B2) which has a different structure from that of the acrylic ester-based polymer (B1), or a methacrylic acid ester-based polymer (B3).

When the polymer block (II) is composed of an acrylic ester-based polymer (B2) having a different structure from that of the acrylic ester-based polymer (B1), the acrylic ester-based polymer (B2) is made from one kind or two or more kinds of the above-described various acrylic esters for the acrylic ester-based polymer (B1), and is made from an acrylic ester or a mixture of acrylic ester, which has a different kind or a different composition (content ratio) of acrylic ester unit from the one mainly composing the acrylic ester-based polymer (B1). Among the compounds, from the viewpoint of the mechanical strength of the obtained thermoplastic elastomer composition, the acrylic ester-based polymer (B2) is preferably comprising structural units derived from one kind or two or more kinds of an acrylic ester selected from methyl acrylate, ethyl acrylate, tert-butyl acrylate, cyclohexyl acrylate and isobornyl acrylate, more preferably comprising structural units derived from methyl acrylate and/or isobornyl acrylate. However, as mentioned above, the acrylic ester-based polymer (B1) constituting the polymer block (I) and the acrylic ester-based polymer (B2) constituting the polymer block (II) are required to have a different structure from each other.

When the polymer block (II) is constituted of the methacrylic acid ester-based polymer (B3), the methacrylic ester-based polymer (B3) is a polymer mainly composed of methacrylic acid ester units, and 60 mol % or more, preferably 80 mol % or more of the structural units of the methacrylic acid ester-based polymer (B3) are the methacrylic acid ester units.

Examples of a methacrylic acid ester unit constituting the methacrylic acid ester-based polymer (B3) as a structural unit include methyl methacrylate, ethyl methacrylate, n-propyl methacrylate, iso-propyl methacrylate, n-butyl methacrylate, isobutyl methacrylate, sec-butyl methacrylate, tert-butyl methacrylate, amyl methacrylate, iso-amyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate, 2-methoxyethyl methacrylate and the like, and the methacrylic acid ester-based polymer (B3) has a structural unit derived from one kind or two or more kinds of methacrylic acid esters described above.

Among the above compounds, from the viewpoint of good heat resistance of the obtained thermoplastic elastomer composition, the methacrylic acid ester-based polymer (B3) constituting the polymer block (II) is preferably composed of structural units derived from one kind or two or more kinds of a methacrylic acid ester selected from methyl methacrylate, ethyl methacrylate, isopropyl methacrylate, n-butyl methacrylate, tert-butyl methacrylate, cyclohexyl methacrylate and isobornyl methacrylate, and more preferably composed of a structural unit derived from methyl methacrylate.

The acrylic ester-based polymer (B1) constituting the polymer block (I), and the acrylic ester-based polymer (B2) constituting the polymer block (II), and/or methacrylic acid ester-based polymer (B3) in the acrylic block copolymer may contain a structural unit derived from other monomers, in addition to the structural unit derived from the acrylic esters or the structural unit derived from methacrylic acid esters described above as far as the characteristics of each polymer block are not impaired (in general, at a ratio of 40 mol % or less relative to the total structural units constituting the polymer block).

The kind of structural unit derived from other monomers that may be contained in the acrylic ester-based polymer (B1), the acrylic ester-based polymer (B2) and the methacrylic acid ester-based polymer (B3) is not particularly limited and is exemplified by an unsaturated carboxylic acid such as methacrylic acid, acrylic acid, and maleic anhydride; an olefin such as ethylene, propylene, 1-butene, isobutylene, and 1-octene; a conjugated diene compound such as 1,3-butadiene, isoprene, and myrcene; a vinylaromatic compound such as styrene, α-methyl styrene, p-methyl styrene, and m-methyl styrene; vinyl acetate; vinyl pyridine; an unsaturated nitrile such as acrylonitrile, and methacrylonitrile; vinyl keton; a halogen-containing monomer such as vinyl chloride, vinylidene chloride, and vinylidene fluoride; an unsaturated amide such as acryl amide, and methacryl amide. The acrylic ester-based polymer (B1), the acrylic ester-based polymer (B2) and the methacrylic acid ester-based polymer (B3) may have a structural unit derived from one kind or two or more kinds of monomers described above.

In order to develop excellent flexibility of the thermoplastic elastomer composition of the present invention and the molded article obtained therefrom, the acrylic block copolymer used in the present invention is preferably the acrylic block copolymer selected from a diblock copolymer represented by a formula: (B1)-(B3), a triblock copolymer represented by a formula: (B1)-(B2)-(B3), and a triblock copolymer represented by a formula: (B3)-(B1)-(B3) [wherein (B1) is a polymer block composed of the acrylic ester-based polymer (B1), (B2) is a polymer block composed of the acrylic ester-based polymer (B2) having a different structure from that of (B1), (B3) is a polymer block composed of the methacrylic acid ester-based polymer (B3), and "-" represents a bond between the polymer blocks]. The thermoplastic elastomer composition of the present invention may contain one kind or two or more kinds of the diblock or triblock copolymer mentioned above. Among them, the triblock copolymer represented by a formula: (B3)-(B1)-(B3) [wherein (B1), (B3) and "-" respectively are the same as in the above] is more preferably used as acrylic block copolymer in the present invention.

Specific examples of acrylic block copolymer preferably used in the present invention include a diblock copolymer such as [poly(n-butyl acrylate)]-[poly(methyl methacrylate)], and [poly(2-ethylhexyl acrylate)]-[poly(methyl methacrylate)]; a triblock copolymer such as [poly(methyl acrylate)]-[poly(n-butyl acrylate)]-[poly(methyl methacrylate)], [poly(methyl acrylate)]-[poly(2-ethylhexyl acrylate)]-[poly(methylmethacrylate)], [poly(methyl methacrylate)]-[poly(ethyl acrylate)]-[poly(methyl methacrylate)], [poly(methyl methacrylate)]-[poly(n-butyl acrylate)]-[poly(methyl methacrylate)], and [poly(methyl methacrylate)]-[poly(2-ethylhexy acrylate)]-[poly(methyl methacrylate)]. Among them, from the viewpoint of heat resistance, triblock copolymers of [poly(methyl methacrylate)]-[poly(n-butyl acrylate)]-[poly(methyl methacrylate)] and [poly(methyl methacrylate)]-[poly(2-ethylhexyl acrylate)]-[poly(methyl methacrylate)] are more preferably used.

Particularly, when the triblock copolymer of [poly(methyl methacrylate)]-[poly(n-butyl acrylate)]-[poly(methyl methacrylate)] is used as an acrylic block copolymer, a thermoplastic elastomer composition, the molded article obtained therefrom and the like which are well-balanced in the mechanical strength and the heat adhesiveness or affinity for coating of a polar resin are obtained.

Although the ratio of the polymer block (I) and the polymer block (II) in the acrylic block copolymer is not particularly limited, from the viewpoint of better flexibility and heat resistance of the thermoplastic elastomer composition of the present invention and the molded article obtained therefrom, the content of the polymer block (I) [when two or more polymer blocks (I) are contained, the content is the total of them] is 40 to 95% by mass, particularly 60 to 90% by mass is preferable, and the content of the polymer block (II) [when two or more polymer blocks (II) are contained, the content is the total of them] is 60 to 5% by mass, particularly 40 to 10% by mass in the total mass of acrylic block copolymer is preferable.

Although the molecular weight of each polymer block in the acrylic block copolymer and the molecular weight of the total acrylic block copolymers are not particularly limited, from the viewpoint of a balance of moldability and dynamic characteristics, the weight average molecular weight of polymer (I) is preferably 2,000 to 400,000, particularly 10,000 to 300,000, and the weight average molecular weight of polymer block (II) is preferably 1,000 to 400,000, particularly 3,000 to 100,000.

Furthermore, the weight average molecular weight of the total acrylic block copolymer is preferably 5,000 to 500,000, particularly 20,000 to 300,000.

It is important that the added amount of the acrylic block copolymer as the component (b) is 2 to 1000 parts by mass relative to 100 parts by mass of the above-mentioned component (a). When the added amount is less than 2 parts by mass, the heat adhesiveness to a hard resin, which is an advantage of the present invention, is significantly reduced. When the added amount exceeds 1000 parts by mass, the rubber elasticity becomes poor. Adding 10 to 800 parts by mass is appropriate.

Component (c)

Next, a block copolymer containing a hydrophilic group of component (c) used in the present invention is not particularly limited as long as the block copolymer contains one or more hydrophilic functional groups of one kind or two or more kinds of a hydroxyl group, a carboxyl group, a hydrolyzable acid anhydride group, a polyalkylene oxide group and the like. The position of the hydrophilic group in the molecule may be any position such as the end of molecular chain, the main chain or the grafted chain. When the hydrophilic group is a polyalkylene oxide group such as a polyethylene glycol group, a polypropylene glycol group and the like, the hydrophilic group may exist as a hydrophilic polymer block in the main chain of the block copolymer. A block copolymer constituting a main chain of the block copolymer containing a hydrophilic group is exemplified by a block copolymer of a low-polar polymer block such as a styrene-based block copolymer, an olefin-based polymer block of component (a), or the like, with a polymer block containing a hydrophilic group; and the like.

Specific examples of the component (c), a block copolymer containing a hydrophilic group, include:

i) a block copolymer having a hydroxyl group at one or both ends of the main chain of the component (a), a styrene-based block copolymer;

ii) a block copolymer having plural maleic anhydride groups in the hydrogenated conjugated diene polymer block (A2) of the component (a), a styrene-based block copolymer; and iii) a block copolymer having a structure composed of a polyolefin block and a hydrophilic polymer block which are bonded alternately with each other.

Among the above block copolymers, preferably a block copolymer of ii) or iii), and more preferably a block copolymer iii) is used.

As an example of the above block copolymer iii) having a structure composed of a polyolefin block and a hydrophilic polymer block which are bonded alternately with each other, a polymer disclosed in the Japanese Patent Laid-Open Publication No. 2001-278985 is mentioned, and a block copolymer having a structure composed of a polyolefin block and a hydrophilic polymer block which are bonded alternately with each other repeatedly, for example, by ester bond, amide bond, ether bond, urethane bond, or imide bond is mentioned. As a polyolefin block constituting a block copolymer, a polyolefin having carbonyl groups, preferably carboxyl groups at both ends of the polymer chain, a polyolefin having hydroxyl groups at both ends of the polymer chain, and a polyolefin having amino groups at both ends of the polymer chain are suitable. Furthermore, a polyolefin having a carbonyl group, preferably a carboxyl group at one end of the polymer chain, a polyolefin having a hydroxyl group at one end of the polymer chain, and a polyolefin having an amino group at one end of the polymer chain may be used as well. Among them, a polyolefin having a carbonyl group is preferable from the viewpoint of the easiness of modification.

As a hydrophilic polymer block constituting the block copolymer of component (c), a polyether, a hydrophilic polymer containing a polyether, a cationic polymer and an anionic polymer may be used. Specifically, a polyether diol, a polyether diamine, and their modified compounds; as a component of forming a polyether segment, a polyether ester amide having a polyether diol segment, a polyether amide imide having a polyether diol segment, a polyether ester having a polyether diol segment, a polyether amide having a polyether diol segment, and a polyether urethane having a polyether diol segment; a cationic polymer having 2 to 80, preferably 3 to 60 cationic groups in the molecule separated by a non-ionic molecular chain; and an anionic polymer having a dicarboxylic acid containing a sulfonyl group, a diol or a polyether as essential constituting units, and 2 to 80, preferably 3 to 60 sulfonyl groups in the molecule.

Specifically, a block copolymer obtained by esterification of a modified polypropylene prepared by reacting polypropylene and maleic anhydride, with a polyalkylene glycol (such as polyethylene glycol and polypropylene glycol) in the presence of a catalyst, is mentioned as a suitable block copolymer. As the block copolymer, "PELESTAT 300" (trade name) placed on the market by Sanyo Chemical Industries Co., Ltd., and the like are mentioned.

Added amount of a block copolymer containing a hydrophilic group of component (c) is 2 to 200 parts by mass relative to 100 parts by mass of the above-mentioned component (a). When the added amount is less than 2 parts by mass, the dispersion of the above-mentioned component (b) becomes insufficient, thus generating problems such as delamination and reducing the tensile strength. The added amount of 200 parts by mass or more causes hardness. Adding 3 to 100 parts by mass is appropriate.

Furthermore, in addition to the above component, an olefin-based polymer may be added as usage to the thermoplastic elastomer composition of the present invention. By adding an olefin-based polymer, mechanical strength or heat resistance of the thermoplastic elastomer composition of the present invention is improved. The olefin-based polymer mentioned here is defined as a polymer obtained by polymerization of a hydrocarbon monomer containing one or two or more unsaturated carbon-to-carbon bonds in the molecule, which includes both a polymer of olefin compound and a polymer containing a hydrocarbon unit in the polymer as a result of modification of a polymer composed of unsaturated hydrocarbon monomers other than the olefin compound. Therefore, specific examples of an olefin-based polymer used in the present invention include a homo-polymer or a copolymer of an olefin compound such as ethylene, propylene, 1-butene, 4-methyl pentene, isobutylene, 1-octene, 1-nonene, norbornene; a homo-polymer, copolymer of a conjugated diene-based hydrocarbon compound such as 1,3-butadiene, isoprene, myrcene, 1,3-dimethyl-1,3-butadiene, 1,4-dimethyl-1,3-butadiene, 1,3-cyclo-hexadiene; a homo-polymer, copolymer, and their hydrogenated polymer of a non-conjugated diene-based hydrocarbon compound such as 1,7-octadiene, 1,4-cyclooctadiene and a hydrogenated product thereof. These may be used alone or in a combination of two or more kinds.

Among them, propylene-based resin is suitable and polypropylene or a copolymer mainly composed of propylene is given as examples. One kind or two or more kinds of a copolymer selected from a homo type propylene, a block type or random type copolymer of propylene with a small amount of an α-olefin is suitably used and among others, a homo type polypropylene is suitably used.

The added amount of the olefin-based polymer is, for example, preferably 500 parts by mass or less relative to 100 parts by mass of above-mentioned component (a). When the added amount exceeds 500 parts by mass, the composition becomes hard, and at the same time, the strength of heat-melt adhesion or heat adhesion to a hard resin is reduced. Specifically, the added amount of 10 parts by mass to 100 parts by mass is suitable.

Furthermore, in addition to the above components, a softening agent for rubber, for example, a mineral oil softening agent composed of a process oil such as a paraffinic oil, a naphthenic oil and an aromatic oil, a liquid paraffin, and the like may be added to the thermoplastic elastomer composition of the present invention depending on the application.

These may be used alone or in a combination of two or more kinds. The amount of a softening agent for rubber to be used is preferably 300 parts by mass or less, more preferably 10 to 150 parts by mass relative to 100 parts by mass of the styrene-based block copolymer (a).

Moreover, a resin such as a styrene-based resin or a polyphenylene ether, or an inorganic filler such as calcium carbonate, talc, carbon black, titanium oxide, silica, clay, barium sulfate, and magnesium carbonate may be added for the purpose of improvement of weather resistance or an increase in the amount. Further, an inorganic or an organic fibrous material such as glass fiber and carbon fiber may also be added. In addition, various unti-blocking agent, a heat stabilizer, an antioxidant, a light stabilizer, an ultraviolet light absorber, a lubricant, a nucleation agent, a foaming agent, a pigment and the like may also be added. An antioxidant is exemplified by a phenol-based antioxidant, a phosphite-based antioxidant, a thioether-based antioxidant and the like. Among these, a phenol-based antioxidant and a phosphite-based antioxidant are particularly preferable. An antioxidant is added at an amount of 3.0 parts by mass as an upper limit, preferably 1.0 part by mass relative to 100 parts by mass of the total components (a) to (c) of the present invention.

Furthermore, depending on the application, the thermoplastic elastomer composition may be crosslinked in the presence of a peroxide and a crosslinking auxiliary. In the crosslinking, in general, a styrene-based block copolymer is crosslinked. As a peroxide, for example, an organic peroxide is suitable, and an organic peroxide such as 2,5-dimethyl-2,5-di(tert-butylperoxy) hexane, and 2,5-dimethyl-2,5-di(tert-butylperoxy) hexyne-3 are particularly preferable from the viewpoint of little odor, little coloring and scorch safety. The blending amount of a peroxide, an organic peroxide in particular, is determined in consideration of the ratio of each component of the present invention, and the quality of the thermoplastic elastomer composition to be obtained in particular, and 0.05 to 3.0 parts by mass relative to 100 parts by mass of the total components (a) to (c) is appropriate. A crosslinking auxiliary may be blended in the production method of the elastomer composition of the present invention upon crosslinking using the above-mentioned organic peroxide to cause homogeneous and efficient crosslinking reaction. As a crosslinking auxiliary, for example, a multi-functional vinyl monomer such as tri-ethyleneglycol di-methacrylate may be blended. The above crosslinking auxiliary dissolves peroxide and acts as a dispersing agent of the peroxide, so that a crosslinking reaction by heat treatment is conducted homogeneously and efficiently. The blending amount of the above crosslinking auxiliary is also determined considering the blending ratio of each component of the present invention described above, and the quality of the thermoplastic elastomer composition to be obtained in particular, and 0.05 to 10 parts by mass relative to 100 parts by mass of the total components (a) to (c) is appropriate.

As a production method of the thermoplastic elastomer composition of the present invention, methods for producing an ordinary resin composition or a rubber composition may be adopted and the composition is producible by homogeneously blending each component using a melt mixer such as a single extruder, a twin extruder, Banbury mixer, a heated roll, and various kneaders. Temperature of a processor is arbitrarily selected from 150° C. to 300° C. and there is no limitation on the production method.

Type A durometer hardness of the thermoplastic elastomer composition of the present invention according to ISO48 is preferably 30 to 90. Moreover, tensile strength at tensile speed of 500 mm/min according to ISO37 is preferably 4 MPa or more, more preferably 4 MPa or more and 15 MPa or less. The high value of tensile strength indicates high compatibility of each component, strong interface adhesion and fine dispersion of dispersing components.

The thermoplastic elastomer composition of the present invention is molded to an arbitrary shape using a known method, for example, various molding methods such as heat press, injection molding, extrusion molding and calender molding. Furthermore, two-step process molding, in which a sheet or film molded by extrusion molding or calender molding is further precisely fabricated by compression molding, may be used. By using such methods, molded articles of in any shape such as a molded material, a pipe, a sheet, a film, a fibrous article, and a laminate containing a layer composed of the above thermoplastic elastomer composition are obtained.

Such composite resin molded articles as a laminate and the like are composed of a thermoplastic hard resin layer and a layer of the thermoplastic elastomer composition of the present invention, in which the hard resin layer keeps rigidness of the molded article, and the purpose of using a hard resin is to form a main body of the molded article or a skeleton of the molded article. Therefore, the thermoplastic hard resin to be used for the composite resin molded article of the present invention may be any resin as long as it has an objective mechanical strength. However, preferable is a hard resin having excellent rigidity and heat resistance, namely, a thermo-plastic hard resin having a bending modulus of 1,000 MPa or more, preferably 1,500 MPa or more, particularly preferably 1,800 MPa or more according to JIS K7171, and a Vicat softening point of 50° C. or higher, preferably 60° C. or higher according to ISO 306 is desirable. Specifically, at least one kind of resin selected from the group consisting of polycarbonate, acrylic resin, styrene-based resin such as ABS resin and polystyrene, polyester resin, polyamide resin, polyvinyl chloride, and modified polyphenylene ether, of which preferably polycarbonate, acrylic resin, styrene-based resin and polyester resin, more preferably polycarbonate, acrylic resin and styrene-based resin, particularly preferably polycarbonate and ABS resin, are used.

The above composite resin molded article is produced, for example, by a co-extrusion molding method in which two materials of the above hard resin and the thermoplastic elastomer composition of the present invention are separately extruded using two extruders and made to flow together into a single nozzle to form a two-layer molded article by heat fusion of the two materials, a two-color molding method in which two materials are formed into a two-layer molded article in one mold using an injection molding machine with two injection nozzles by heat fusion, or an insert injection molding method in which the above-mentioned hard resin molded article obtained by an injection molding machine is inserted in a mold and the thermoplastic elastomer composition is injected to the mold to form a two-layer molded article by heat fusion. By heat fusion or heat adhesion, a composite resin molded article having excellent peeling strength is obtained without using any adhesive.

The molded article made from the thermoplastic elastomer composition of the present invention such as the above has excellent flexibility, mechanical strength, weather resistance, water resistance and the like, therefore is be used for various applications. Examples of application of a molded article made from the thermoplastic elastomer composition alone include application for food such as food packaging sheet, application for stationery such as desk mat, application for automobile such as rack and pinion boot, suspension boot, constant velocity joint boot, hose, and tube; application for civil engineering and construction such as civil engineering sheet, waterproof sheet, sealing material for window frame, sealing material for building, various hoses, and knobs; application for electric household appliances and electrical equipment such as vacuum cleaner bumper, refrigerator door seal, products for subaqueous use of underwater camera cover and the like, remote control switch pad, and keycaps of mobile phone and the like; application for audio-visual equipment such as various switches; application for office automation equipment; application for various packings for achieving sealing properties, waterproofing properties, sound insulation properties, vibration absorption properties and the like; application for industry such as masks, including a dust mask and the like; application for shoe sole, footwear and clothing items; application for toys; and application for medical equipment; and the like. Thus, the molded article may be used in various applications.

Furthermore, examples of application of the composite resin molded article composed of the thermoplastic elastomer composition and a thermoplastic hard resin include application for food packaging materials such as food packaging sheet, and cap liner; application for convenience goods such as toothbrush handle, and cosmetic case; application for sports equipment or toys such as ski equipment including ski shoes and the like, water goggles for divers, swimming goggles, and external skin and core materials of golf ball; application for stationery such as pen grip and desk mat; application for automobile interior and exterior such as automobile interior parts of instrument panel, center panel, center console box, door trim, pillar, assist grip, steering wheel, knob, air bag cover and the like, bumper guard, and molding; application for automobile electric and electronic parts such as automobile functional parts including rack and pinion boot, suspension boot, constant velocity joint boot and the like, curl code wire coating, belt, hose, tube, and sound-deadening gear; application for civil engineering and construction such as civil engineering sheet, waterproof sheet, sealing material for window frame, sealing material for building, various hoses, and knobs; application for electric household appliances and electrical equipment such as vacuum cleaner bumper, refrigerator door seal, products for subaqueous use of underwater camera cover and the like, and household electrical parts of mobile phone housing, remote control switch, various keycaps for mobile phone and OA equipment and the like; application for audio-visual equipment such as connector, bobbin and various switches; application for office automation equipment; application for industry such as various covering parts, industrial parts with various packings for achieving sealing properties, waterproofing properties, sound insulation properties, vibration absorption properties and the like, masks such as a dust mask and the like, transporter tray for precision parts, and automated robot parts; application for footwear and clothing items such as handle of briefcase, shoe sole and top lift; application for textiles; application for toys; application for medical equipment; and the like.

EXAMPLES

The present invention is explained more specifically and in more detail in the following with reference to Examples. However, the present invention is by no means restricted by these Examples.

Evaluation of the performance of the thermoplastic elastomer composition obtained according to the present invention was made by the methods shown below.

In Examples 1 to 4, and Comparative Examples 1 to 3 in Table 1, there were used a styrene-based block copolymer as component (a), an acrylic block copolymer as component (b), a propylene-based hydrophilic block copolymer as component (c), and the olefin-based polymer and mineral oil softening agent as other additives, which are mentioned below.

Component (a)

Product name: SEPTON4055, Manufacturer: Kuraray Co., Ltd., Species: styrene-ethylene propylene-styrene type triblock copolymer (a hydrogenated polystyrene-isoprene butadiene random polymer-polystyene type triblock copolymer), Content of styrene unit: 30% by mass, Number average molecular weight: 200,000, hydrogenation rate: 98 mol %

Component (b)

Acrylic block copolymer: an acrylic block copolymer that is a triblock copolymer composed of [poly(methyl methacrylate)]-[poly(n-butyl acrylate)]-[poly(methyl methacrylate)], of which the content of poly(methyl methacrylate) is 30% by mass, and the weight average molecular weight of the total triblock copolymer is 77,000, was used.

Component (c-1)

Product name: PELESTAT 300, Manufacturer: Sanyo Chemical Industries, Ltd., Species: Block copolymer obtained by esterification of a modified polyolefin prepared by reacting polyolefin mainly composed of polypropylene and maleic anhydride, with a polyalkylene glycol mainly composed of polyethylene glycol in the presence of a catalyst Component (c-2)

Product name: TAFTEC M1913, Manufacturer: Asahi Kasei Corporation, Species: maleic anhydride-modified styrene-butadiene type block copolymer Component (c-3)

Product name: HPR AR201, Manufacturer: Du Pont-Mitsui Polychemicals Co., Ltd., Species: maleic anhydride-modified ethylene-ethylacrylate random copolymer resin, Ethylene/ethylacrylate mass ratio: 70/30, Content of maleic anhydride 2% by mass Component (c-4)

Product name: ADMER QF500, Manufacturer: Mitsui Chemicals, Inc., Species: polypropylene modified with maleic anhydride Component (c-5)

Product name: ADMER NF528, Manufacturer: Mitsui Chemicals, Inc., Species: polyethylene modified with maleic anhydride Olefin-Based Polymer Product name: NOVATEC Polypropylene MA03, Manufacturer: Japan Polypropylene Corporation, Species: polypropylene Mineral Oil Softening Agent Product name: DIANA PROCESS OIL PW-90, Manufacturer: Idemitsu Kosan Co., Ltd., Species: paraffinic process oil I) Hardness and Tensile Strength Disk sheets of 2 mm in thickness and 120 mm in diameter were prepared from the thermoplastic elastomer composition shown in Table 1, using an injection molding machine (200° C.). Using this molded disk sheet, Type A durometer hardness according to ISO 48, and tensile strength according to ISO 37 using a dumbbell type test piece at a tensile speed of 500 mm/min, were measured. FE120 manufactured by Nissei Plastic Industrial Co., Ltd. was used as the injection molding machine.

II) Heat Fusing and Heat Adhesion Properties of the Composite Molded Article Obtained by Insert Molding of a Thermoplastic Hard Resin A strip specimen of a hard resin plate was inserted in a metal mold, into which the thermoplastic elastomer composition shown in Table 1 was injected by an injection molding machine (FE120 manufactured by Nissei Plastic Industrial Co., Ltd., cylinder temperature of 200° C.), and a two-layer composite plate laminating the hard resin layer (4 mm in thickness×25 mm in width×150 mm in length) and the thermoplastic elastomer composition layer (3 mm in thickness× 25 mm in width×200 mm in length) was produced. Then, by using a tensile tester, the peeling strength was measured by peeling off the thermoplastic elastomer composition layer from the hard resin layer of composite plate at 180 degrees angle.

The abbreviation for and the specification of the thermoplastic hard resin used in the insert molding are as follows:

ABS: Acrylonitrile/butadiene/styrene copolymer resin ([CYCOLAC EX 111] manufactured by General Electric Co., Flexural modulus: 2750 MPa, Vicat softening point: 99° C.)

PC: Polycarbonate resin ([Panlite L1225] manufactured by Teijin Chemicals Ltd., Flexural modulus: 2350 MPa, Vicat softening point: 146° C.)

PMMA: Methyl methacrylate resin ([Parapet GF] manufactured by Kuraray Co., Ltd., Flexural modulus: 3300 MPa, Vicat softening point: 92° C.)

III) Affinity for Coating

On the disk sheet prepared from a thermoplastic elastomer composition shown in Table 1 using the above-mentioned injection molding machine, was applied a urethane-based coating (Two-liquid component polyurethane polyol, trade name: TAKELAC E-550 manufactured by Mitsui Takeda Chemicals, Inc.). After letting the coating stand in a constant-temperature bath set at 80° C. for 2 hours to harden the coating, the disk sheets were left for 72 hours under two different environmental conditions (normal environment, high temperature-high humidity environment). Then a peeling test of the coated film was conducted using cross-cut adhesion tape test. The cross-cut adhesion test is a method cutting the coated film in grids (2 mm square×25 grids) deep enough to penetrate the coated film and reach the substrate, sealing with a cellophane adhesive tape, then peeling the tape, and counting the number of grids remaining on the substrate. The environmental conditions for leaving the disk sheets were set at a normal condition (25° C., 50% humidity) and a high temperature-high humidity condition (50° C., 95% humidity).

Examples 1 to 5 and Comparative Examples 1 to 6

According to the compositions shown in Table 1, each constituent was mixed and the mixture was melt-kneaded at 200° C. using a twin extruder (nozzle diameter: 46 mm, L/D=46) to obtain a pellet-shaped thermoplastic elastomer composition. The results of evaluation of the molded articles and the composite molded articles according to the above I) to III) are shown in Table 1.

TABLE 1

| | unit | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| Component (a) Styrene-based block copolymer | part by mass | 100 | 100 | 100 | 100 | 100 | 100 | 100 | 100 | 100 | 100 | 100 |
| Component (b) Acrylic block copolymer | | 100 | 100 | 800 | 500 | 10 | — | 500 | — | 100 | 100 | 100 |
| Component (c-1) hydrophilic group-containing block copolymer | | 10 | | 20 | 30 | 100 | 10 | — | — | | | |
| Component (c-2) hydrophilic group-containing block copolymer | | | 10 | | | | | | | | | |
| Component (c-3) hydrophilic group-containing copolymer | | | | | | | | | | 10 | | |
| Component (c-4) hydrophilic group-containing polymer | | | | | | | | | | | 10 | |
| Component (c-5) hydrophilic group-containing polymer | | | | | | | | | | | | 10 |
| Olefin-based polymer | | 30 | 30 | 100 | — | — | 30 | — | 30 | 30 | 30 | 30 |
| Mineral oil softening agent | | 100 | 100 | 50 | 50 | 50 | 50 | 50 | 100 | 100 | 100 | 100 |
| Hardness (ISO A type) | | 44 | 30 | 85 | 65 | 75 | 70 | 63 | 48 | 38 | 42 | 40 |
| Tensile strength | MPa | 6.3 | 4.8 | 11.2 | 8.3 | 9.9 | 12.0 | 1.9 | 8.2 | 2.4 | 2.6 | 2.3 |

TABLE 1-continued

|  | unit | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| Heat adhesion to ABS (180 degrees peeling strength) | N/25 mm | 72 | 60 | 56 | 88 | 48 | 18 | 85 | 1 or less | 33 | 25 | 26 |
| Heat adhesion to PC (180 degrees peeling strength) | N/25 mm | 78 | 65 | 62 | 90 | 51 | 21 | 89 | 1 or less | 38 | 26 | 28 |
| Heat adhesion to PMMA (180 degrees peeling strength) | N/25 mm | 81 | 65 | 59 | 93 | 49 | 20 | 89 | 1 or less | 44 | 30 | 33 |
| Affinity for coating (normal condition, cross-cut test x 25) | No. | 25 | 25 | 25 | 25 | 25 | 22 | 25 | 5 | 20 | 15 | 16 |
| Affinity for coating (hi temp. hi humid, cross-cut test x 25) | No. | 25 | 25 | 25 | 25 | 25 | 15 | 25 | 4 | 16 | 12 | 14 |

The thermoplastic elastomer composition of Examples 1 to 5 according to the prescription of the present invention offered excellent values of flexibility (hardness), strength, heat adhesiveness and affinity for coating with three kinds of thermoplastic hard resins.

As for the composition in Comparative Example 1 not containing the acrylic block copolymer of component (b), and in Comparative Example 3 containing the styrene-based block copolymer of component (a) alone, heat adhesiveness and affinity for coating with thermoplastic hard resin both were insufficient, although flexibility and strength were satisfactory.

The composition in Comparative Example 2 not blending the hydrophilic group-containing block copolymer of component (c) offered a low tensile strength and easily broke with delamination (peeling between layers), although heat adhesiveness and affinity for coating were satisfactory. Further, in the measurement of peeling strength, there were some cases where the measurement of peeling strength was impossible because the composition easily broke. Furthermore, in Comparative Examples 4 to 6 in which the components (c-3) to (c-5), which have a hydrophilic group but were not block copolymers, were blended as a component (c), tensile strength, heat adhesiveness and affinity for coating were all inferior to those in Example 1.

INDUSTRIAL APPLICABILITY

In various fields such as interior and exterior parts of automobile, home electric appliances, building materials, furniture, sports goods, toys and convenience goods, by laminating an elastomer layer on a thermoplastic hard resin molded article, for improving the air-tightness and moisture resistance to prevent leakage of gas, liquid and the like, the shock absorption of a molded article, the non-slip effect, or the touch, a thermoplastic elastomer composition and a composite molded article thereof having excellent flexibility, rubber elasticity, water resistance, weather resistance, moldability, and heat adhesiveness to a thermoplastic hard resin such as polycarbonate, ABS resin, acrylic resin, styrene-based resin and polyester resin can be provided.

The invention claimed is:

1. A thermoplastic elastomer composition comprising:
   (a) a styrene-based block copolymer having a number average molecular weight of 70,000 or more formed by hydrogenation of a block copolymer having at least two terminal polymer blocks (A1) comprising a vinyl aromatic compound unit, and at least one intermediate polymer block (A2) comprising a conjugated diene compound unit;
   (b) an acrylic block copolymer comprising at least one polymer block (I) and at least one polymer block (II), the at least one polymer block (I) comprising an acrylic ester-based polymer (B1), and the at least one polymer block (II) comprising an acrylic ester-based polymer (B2) having a different structure from the acrylic ester-based polymer (B1), or a methacrylic acid ester-based polymer (B3); and
   (c) a block copolymer comprising a hydrophilic group;
   wherein:
   the acrylic block copolymer (b) is present in an amount of 2 to 1,000 parts by mass relative to 100 parts by mass of the styrene-based block copolymer (a); and
   the block copolymer (c) is present in an amount of 3 to 100 parts by mass relative to 100 parts by mass of the styrene-based block copolymer (a).

2. The thermoplastic elastomer composition according to claim 1, further comprising an olefin-based polymer in an amount of 10 to 500 parts by mass relative to 100 parts by mass of the styrene-based block copolymer (a).

3. The thermoplastic elastomer composition according to claim 1 further comprising a softening agent for rubber in an amount of 10 to 300 parts by mass relative to 100 parts by mass of the styrene-based block copolymer (a).

4. A molded article comprising the thermoplastic elastomer composition according to any of claims 1 to 3.

5. A composite resin molded article comprising the thermoplastic elastomer composition according to any of claims 1 to 3 and a thermoplastic hard resin.

* * * * *